US011561835B2

(12) United States Patent
Ranjan et al.

(10) Patent No.: US 11,561,835 B2
(45) Date of Patent: Jan. 24, 2023

(54) UNIFIED CONTAINER ORCHESTRATION CONTROLLER (71) Applicant: HEWLETT PACKARD ENTERPRISE DEVELOPMENT LP, Houston, TX (US)

(72) Inventors: Jyoti Ranjan, Bangalore (IN); Prabhu Murthy, Bangalore (IN); Paul Murray, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 308 days.

(21) Appl. No.: 16/887,001

(22) Filed: May 29, 2020

(65) Prior Publication Data

US 2020/0379812 A1  Dec. 3, 2020

(30) Foreign Application Priority Data

May 31, 2019 (IN) .............................. 201941021738

(51) Int. Cl.
G06F 16/22 (2019.01)
G06F 9/50 (2006.01)
(52) U.S. Cl.
CPC ............ G06F 9/5022 (2013.01); G06F 16/22 (2019.01)

(58) Field of Classification Search
CPC .......... G06F 9/546; G06F 9/541; G06F 9/542; G06F 9/5022; G06F 16/22
See application file for complete search history.

(56) References Cited

U.S. PATENT DOCUMENTS

| 10,241,774 | B2 * | 3/2019 | Spivak ................... H04L 67/10 |
| 10,855,620 | B2 * | 12/2020 | Mordani ............... H04L 47/827 |
| 2004/0073782 | A1 * | 4/2004 | Price ................... H04L 41/0869 713/1 |
| 2012/0233668 | A1 * | 9/2012 | Leafe .................. G06F 9/44526 726/4 |
| 2014/0223425 | A1 * | 8/2014 | Brown ...................... G06F 8/65 717/173 |
| 2015/0089039 | A1 * | 3/2015 | Mehta ................. G06F 11/1438 709/223 |
| 2017/0257432 | A1 * | 9/2017 | Fu ........................... H04L 67/34 |

\* cited by examiner

Primary Examiner — Chirag R Patel
(74) Attorney, Agent, or Firm — Mauriel Kapouytian Woods LLP (57) ABSTRACT A system to facilitate a container orchestration cloud service platform is described. The system includes a controller to manage Kubernetes cluster life-cycle operations created by each of a plurality of providers. The controller includes one or more processors to execute a controller micro service to discover a provider plugin associated with each of the plurality of providers, and perform the cluster life-cycle operations at a container orchestration platform as a broker for each of a plurality of providers.

18 Claims, 6 Drawing Sheets

UNIFIED CONTAINER ORCHESTRATION CONTROLLER

BACKGROUND

A cloud service may refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as example, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

A public cloud is an environment at which IaaS or PaaS is offered by a cloud service provider. The services of the public cloud may be used to deploy applications. In other examples, a public cloud may also offer SaaS, such as in examples where the public cloud offers the SaaS as a utility (e.g. according to a subscription or pay as you go model). Public clouds implement virtualization technology to deploy a virtual infrastructure based on native hardware. Virtualization technology has typically been employed via virtual machine (VMs), with each application VM having a separate set of operating system, networking and storage. However, containers are increasingly becoming a preferred choice for deployment of application workloads.

Containers provide an enhanced technology (e.g., micro services), simplified manageability and increased resource utilization (e.g., more containers per server than VMs) compared to VMs. For instance, containers include components that are created from multiple, self-contained runtimes. However, the manageability of containers provides significant challenges. For example, the emergence of micro service architectures results in a significant increase in containers in which one functional unit effectively represents one container. Thus, a number of containers needed to implement a solution may have a 10× increase.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

In embodiments a container orchestration controller is provided to facilitate a container orchestration cloud service platform. In such embodiments, the container orchestration controller manages Kubernetes cluster life-cycle operations for each of a plurality of KaaS providers by operating as a broker to perform the cluster life-cycle operations at a Kubernetes platform on behalf of each of a plurality of KaaS providers.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
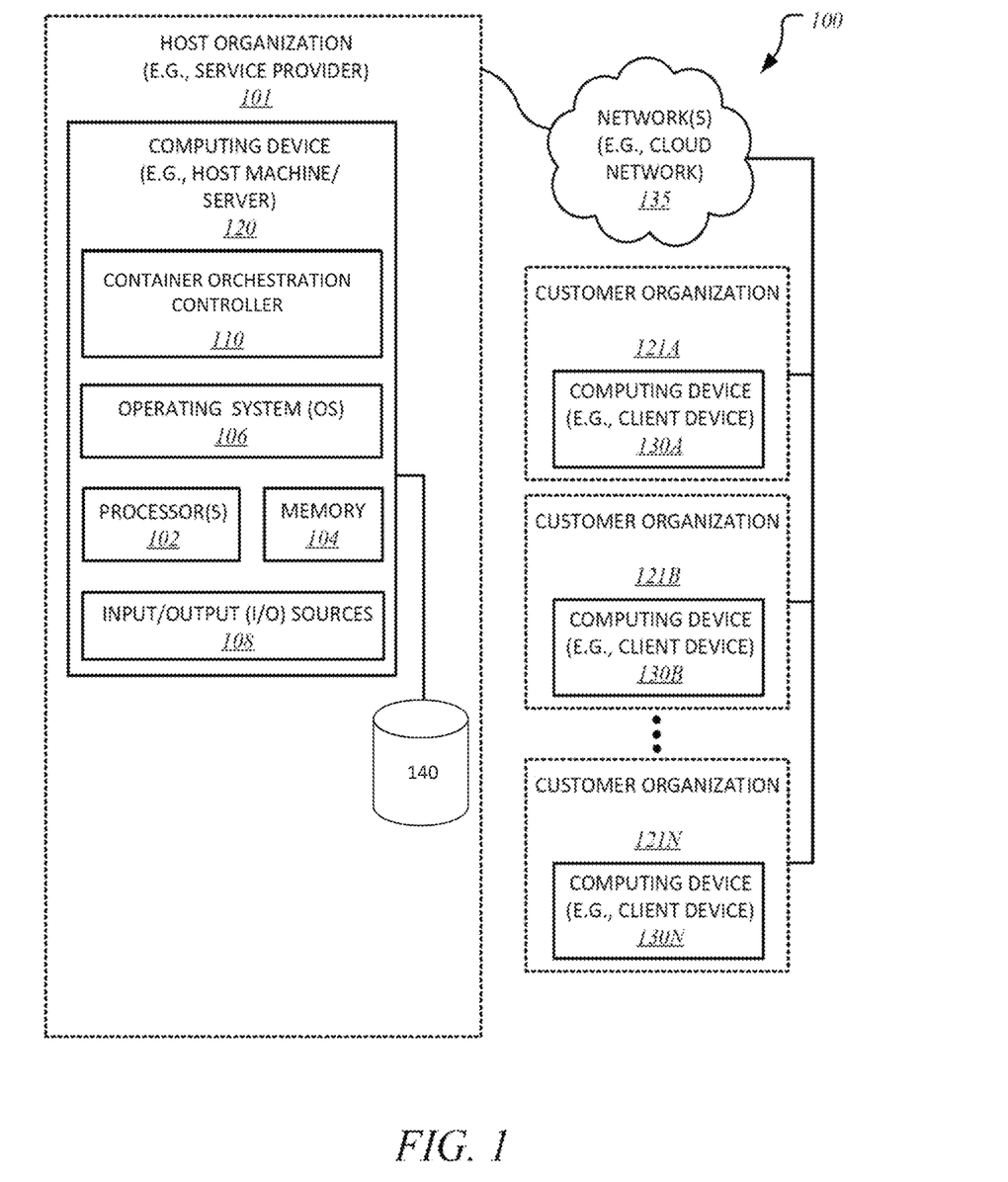
FIG. 1 illustrates one embodiment of a system employing a unified container orchestration controller.

FIG. 1 illustrates one embodiment of a system 100 having a computing device 120 employing a container orchestration controller (or controller) 110. In one embodiment, container orchestration enables automated deployment, configuration, coordination and management of multi-container applications in a containerized architecture. As shown in FIG. 1, computing device 120 includes a host server computer serving as a host machine for employing controller 110 to facilitate a provisioning of cluster life-cycles (e.g., public and private) accessible by customer organizations 121 via a PaaS or IaaS. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system—based navigation systems, cable setup boxes, etc.

In one embodiment, the illustrated database(s) 140 store (without limitation) information and underlying database records having customer and user data therein on to process data on behalf of customer organizations 121A-N. In some embodiments, host organization 101 receives input and other requests from a plurality of customer organizations 121A-N over one or more networks 135; for example, incoming data, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may serve as a service provider core for hosting and maintaining controller 110 as a SaaS or IaaS, and be in communication with one or more client computers 130A-N, over one or more network(s) 135, and any number and type of dedicated nodes. In such an embodiment, host organization 101 implements container orchestration controller 110 as a broker (or agent) to facilitate unified manageability of cluster life-cycles accessible by customer organizations 121 (e.g., public and private) via a self-service SaaS portal. In one embodiment, container orchestration controller 110 may be implemented as a Unified Kubernetes as a Service (KaaS) controller that manages Kubernetes cluster life-cycle operations as an agent of one or more KaaS providers.

Kubernetes provides a cluster management platform implemented for automating deployment, scaling, and operations of application containers across clusters of hosts. Kubernetes systems include various object types that define a set of primitives (e.g., containers, pods and clusters). Containers are packages that rely on virtual isolation to deploy and run applications that access a shared OS. Pods provide a higher level of abstraction that includes a group of containers that are guaranteed to be co-located on the same host machine to share resources Containers within a pod can reference all other containers in the pod. A cluster includes two or more pods, in which each pod is assigned a unique pod identifier (ID). Although described herein with regards to a Kubernetes system, other embodiments may feature an implementation of different types of container orchestration architectures (e.g., Docker, Mesos, etc.).

Figure 2:
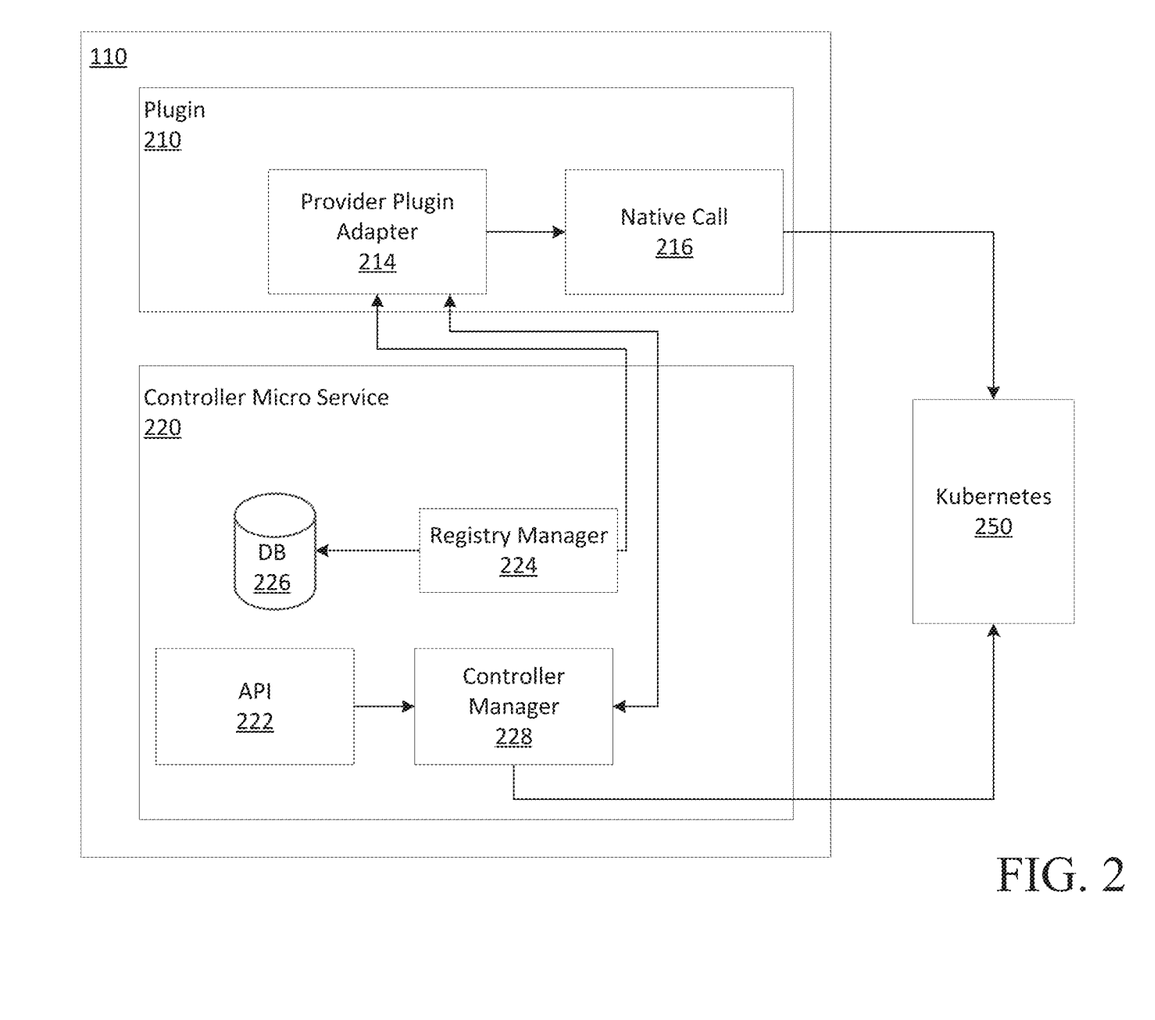
FIG. 2 is a block diagram illustrating one embodiment of a unified container orchestration controller.

FIG. 2 is a block diagram illustrating one embodiment of unified container orchestration controller 110. In one embodiment, controller 110 provides a plugin based discovery model for third party KaaS providers supporting Kubernetes platform deployment (e.g., OpenShift, Rancher, etc.). As shown in FIG. 2, controller 110 includes a provider plugin component 210 and a controller microservice 220, each coupled to a Kubernetes platform 250. Plugin component 210 includes a provider plugin adapter 214 and a native call module 216, while controller microservice 220 includes application programming interface (API) 222, registry manager 224, database 226 and controller manager 228. According to one embodiment, each plugin component 210 is associated with a provider (e.g., a customer organization 121) that provides KaaS cluster services, while microservice 220 manages the Kubernetes clusters implemented via the provider plugin components 210.

Provider plugin adapter 214 at plugin component 210 is a micro-service implemented to publish an availability of the microservice. In one embodiment, availability is published by pushing a message to a topic (e.g., a Simple Notification Service (SNS) topic) created by a registry manager 225 at controller microservice 220, as discussed in more detail below. Provider plug-in adapter 214 also publishes supported cluster life-cycle operations requested by registry manager 225. Further, provider plugin adapter 214 facilitates cluster lifecycle operations via native call module 216 upon request by controller manager 227. Accordingly, native call module 216 invokes a KaaS native call associated with Kubernetes platform 250 to request generation of a Kubernetes cluster.

API 222 is a Representational State Transfer (REST) that defines a set of constraints to be used for creating cluster life-cycle operations. Registry manager 224 is implemented to discover provider plugins 210 that support Kubernetes cluster deployment. In one embodiment, registry manager 224 initializes each discovered provider plugin 210. In such an embodiment, registry manager 224 creates a SNS topic and a queue in response to discovering a provider plugin 210. For instance, registry manager 224 may create a SNS topic named 'plugin-discovery-topic, and a queue called 'plugin-registry' for a particular provider plugin 210, which subscribes to a SNS topic. Subsequently, messages pushed to 'plugin-discovery-topic' is cascaded to queue 'plugin-registry' where it is processed by registry manager 224.

Registry manager 224 also performs a capability discovery operations to discover a set of operations supported by a discovered provider plugin 210. According to one embodiment, the discovery operations are performed via a pull model in which a provider plugin is requested to publish supported attributes, such as supported life-cycle operations and a set of parameters needed for each operation. However other embodiments may implement different models to perform discovery operations. Database 226 is a registry database that stores the plugin provider information Controller manager 228 manages the operation of controller 110. In one embodiment, controller manager 228 accepts API requests, creates tracking requests representing user requests. In the case of an asynchronous call, for example, controller manager 228 returns a tracking identifier (ID) that may be used to receive a live status. In a further embodiment, controller manager 228 maps user requests to provider plugin 210 requests, invokes a provider plugin API, processes the provider plugin 210 response and translates the response to a format native to host organization 101. In yet further embodiments, controller manager 228 transmits responses to users for synchronous and asynchronous calls, as well as tracks the calls. In still a further embodiment, controller manager 228 maintains an inventory of response returns to provide analytics.

Figure 3:
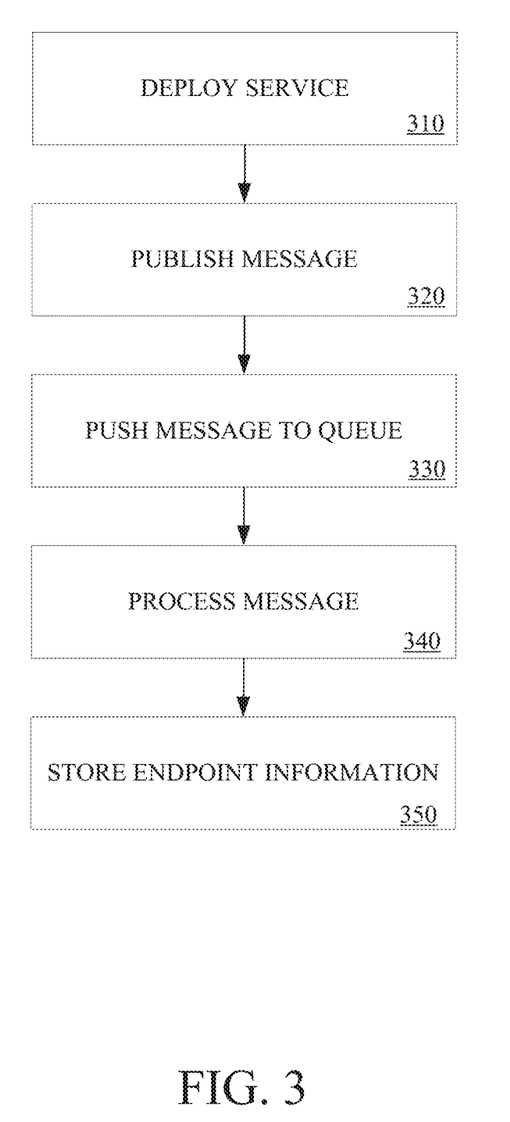
FIG. 3 is a flow diagram illustrating one embodiment of a method for discovering a plugin.

As discussed above, provider plugin components 210 are registered with microservice 220 via a provider discovery process performed by registry manager 224. FIG. 3 is a flow diagram illustrating one embodiment of a plugin discovery method. At processing block 310, a provider service is deployed. In one embodiment, a provider plugin component 210 is deployed upon a system administrator associated with the provider deploying plugin adapter 214. At processing block 320, plugin adapter 214 publishes a message (e.g., 'plugin-discovery-topic') to a SNS topic previously created by registry manager 224. At processing block 330, the message is pushed to a simple service queue (SQS) (e.g., 'plugin-registry') previously created by registry manager 224. At processing block 340, registry manager 224 pulls the message from the queue and processes the message. At processing block 350, the provider plugin component 210 information is stored in database 226.

Figure 4:
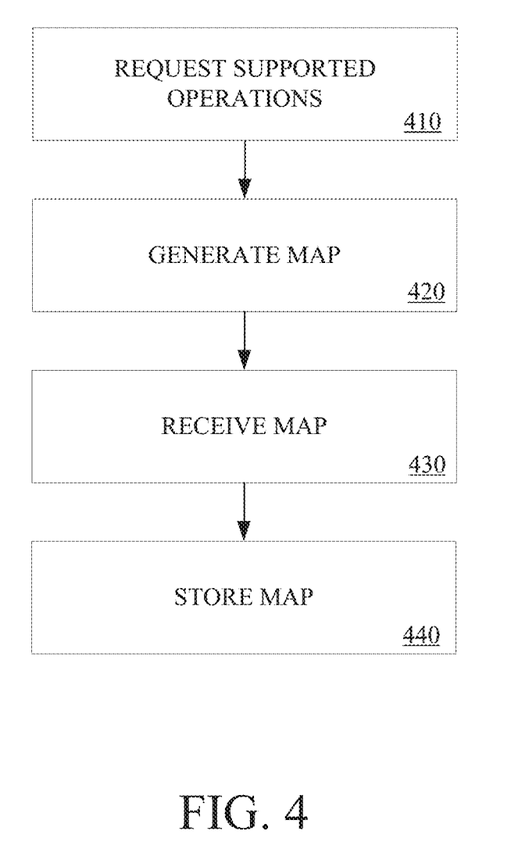
FIG. 4 is a flow diagram illustrating one embodiment of a method for discovering capabilities of a plugin.

Once the provider discovery process has been completed, registry manager 224 performs a further process to discover the capabilities of the provider plugin component 210. FIG. 4 is a flow diagram illustrating one embodiment of a method for discovering capabilities of a plugin component. At processing block 410, registry manager 224 requests a list of life-cycle operations from plugin component 210. At processing block 420, plugin component 210 creates a map that includes the list of operations. In one embodiment, the map includes the provider's REST endpoint to implement a operation, REST operation payload and parameter constraints, if any, for REST operation. At processing block 430, registry manager 224 receives the map from plugin component 210. At processing block 440, the map is stored at database 226. According to one embodiment, the map enables controller manager 228 to operate as a broker for the provider and to make calls to plugin adapter 214 for cluster life-cycle operations (e.g., create cluster, scale-up cluster, etc.).

Figure 5:
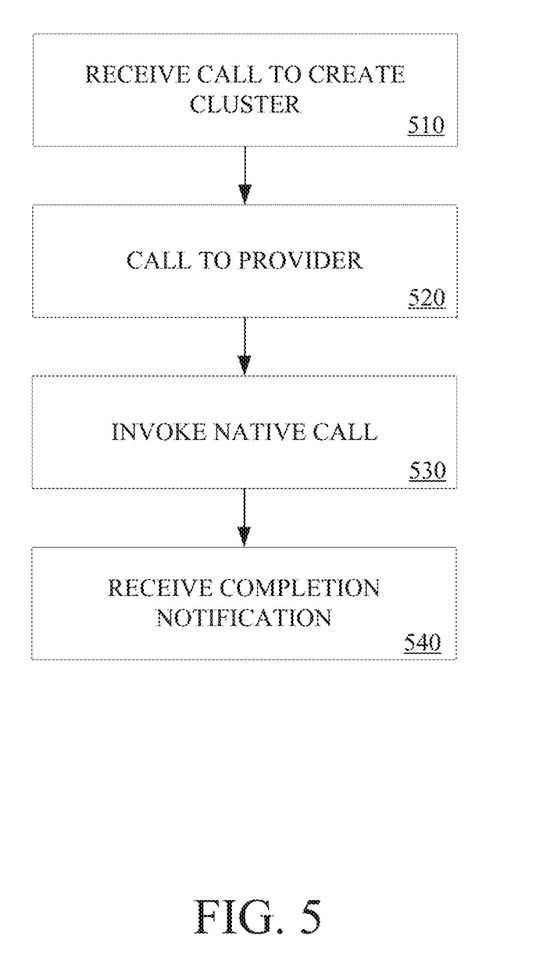
FIG. 5 is a flow diagram illustrating one embodiment of a method for generating a cluster life-cycle operation.

Once established as a broker, controller manager 228 may be implemented to create cluster life-cycle. FIG. 5 is a flow diagram illustrating one embodiment of a method for generating a cluster life-cycle operation. At processing block 510, a request to create a cluster is received at controller manager 228 from an operator (or user) of microservice 220. At processing block 520, controller manager 228 a call to plugin adapter 214 to create the cluster is transmitted. At processing block 530, native call module 216 invokes a call to Kubernetes platform 250 to create the cluster. In one embodiment, a tracking ID may be generated to enable the user to track the status of the operation since the cluster creation process may require a significant amount of time to complete. Controller manager 228 receives a notification once the cluster creation operation has been completed, processing block 540. In one embodiment, the notification is received from adapter 214. However in other embodiments the notification may be received directly from Kubernetes platform 250.

Once the cluster life-cycle has been created, a user may directly access and manage the cluster at Kubernetes platform 250 via microservice 220. According to one embodiment, may implement management features provided by host organization 101 (e.g., deploy and configure load balancing, Elasticsearch, Logstash and Kibana (ELK stack) and Istio). Additionally, various cloud services may be implemented on the cluster (e.g., deploy and configure scheduler, marketplace agents, compliance and governance, and storage plugins and classes.

Figure 6:
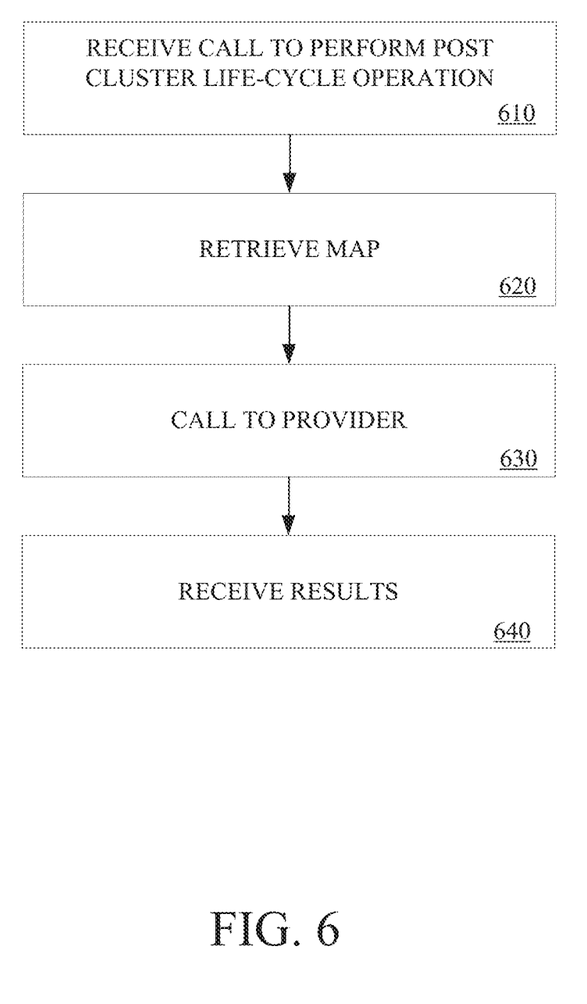
FIG. 6 is a flow diagram illustrating one embodiment of a method for performing a post cluster creation life-cycle operation.

In a further embodiment, post cluster life-cycle operations (e.g., scale-up, scale-down, etc.) may be employed once a cluster has been created. FIG. 6 is a flow diagram illustrating one embodiment of a method for performing a post cluster creation life-cycle operation. At processing block 610, a request to perform a post cluster creation life-cycle operation is received at controller manager 228 from a user of microservice 220. At processing block 620, the operation map associated with the provider is retrieved by controller manager 228. At processing block 630, controller manager 228 makes a call to plugin adapter 214 to perform the operation. At processing block 640, the results are received from plugin adapter 214. According to one embodiment, processing blocks 620-640 may be implemented via a synchronous operation, which is a short-lived task. Alternatively, processing blocks 620-640 may be implemented via a long lived asynchronous operation. In such an embodiment, a tracking ID may be generated to enable the user to track the status of the operation, as discussed above.

The above-described controller provides a unified tool and interface to enable users to provision Kubernetes clusters regardless of provider. Additionally, the controller enables user to create Kubernetes cluster using a KaaS provider of choice (OpenShift, GKE, and PF9 etc.). Further, clusters created by any KaaS provider can be augmented with host add on services.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate a container orchestration cloud service platform, comprising:
    a controller comprising a plugin based discovery model to manage cluster life-cycle operations for each of a plurality of providers, including:
        one or more processors to execute a controller micro service to discover a provider plugin associated with each of the plurality of providers, wherein discovering the provider plugin comprises: creating a topic in response to discovering the provider plugin, and creating a queue in response to discovering the provider plugin; and
        perform the cluster life-cycle operations at a container orchestration platform as a broker via the provider plugin for each of a plurality of providers.

2. The system of claim 1, wherein discovering the provider plugin comprises:
    receiving a message at the controller micro service from the provider plugin; and
    storing the message in a database.

3. The system of claim 2, wherein discovering the provider plugin further comprises performing a capability discovery to discover a set of operations supported by the provider plugin.

4. The system of claim 2, wherein the capability discovery comprises:
    receiving a map of operations at the controller micro service from the provider plugin; and
    storing the map in the database.

5. The system of claim 1, wherein performing the cluster life-cycle operations comprises creating a cluster life-cycle.

6. The system of claim 5, wherein creating the cluster life-cycle comprises:
    receiving a request at the controller micro service to create the cluster life-cycle;
    transmitting a call to the provider plugin to create the cluster life-cycle; and
    receiving a notification at the controller micro service indicating that the cluster life-cycle has been created.

7. The system of claim 6, wherein creating the cluster life-cycle further comprises the controller micro service generating a tracking identifier (ID) to enable tracking a status during creation of the cluster life-cycle.

8. The system of claim 6, further comprising the controller micro service managing the cluster life-cycle at container orchestration platform once the cluster life-cycle has been created.

9. A system to facilitate a container orchestration cloud service platform, comprising:
    a controller comprising a plugin based discovery model to manage cluster life-cycle operations created by each of a plurality of providers, including:
        one or more processors to execute a provider plugin associated with each of the plurality of providers, wherein discovering the provider plugin comprises:
        creating a topic in response to discovering the provider plugin, and creating a queue in response to discovering the provider plugin, wherein each provider plugin is communicatively coupled to a container orchestration platform; and
        one or more processors to execute a controller micro service, communicatively coupled to each of the provider plugins and the container orchestration platform, to discover the provider plugin associated with each of the plurality of providers, and perform the cluster life-cycle operations at a container orchestration platform as a broker via the provider plugin for each of a plurality of providers.

10. The system of claim 9, wherein the controller micro service discovering the provider plugin further comprises:
    receiving a message from the provider plugin at the queue; and
    storing the message in a database.

11. The system of claim 10, wherein the controller micro service discovering the provider plugin further comprises performing a capability discovery to discover a set of operations supported by the provider plugin.

12. The system of claim 10, wherein the capability discovery comprises:
    receiving a map of operations at the controller micro service from the provider plugin; and
    storing the map in the database.

13. The system of claim 9, wherein the controller micro service performing the cluster life-cycle operations comprises creating a cluster life-cycle.

14. The system of claim 13, wherein creating the cluster life-cycle comprises:
    receiving a request at the controller micro service to create the cluster life-cycle;
    transmitting a call to the provider plugin to create the cluster life-cycle; and
    receiving a notification at the controller micro service indicating that the cluster life-cycle has been created.

15. The system of claim 14, wherein creating the cluster life-cycle further comprises the controller micro service generating a tracking identifier (ID) to enable tracking a status during creation of the cluster life-cycle.

16. The system of claim 15, further comprising the controller micro service managing the cluster life-cycle at container orchestration platform once the cluster life-cycle has been created.

17. A method to facilitate a container orchestration cloud service platform, comprising:
    managing cluster life-cycle operations created by each of a plurality of providers, including:
        a controller micro service discovering a provider plugin associated with each of the plurality of providers, wherein discovering the provider plugin comprises:
        creating a topic in response to discovering the provider plugin, and creating a queue in response to discovering the provider plugin; and performing the cluster life-cycle operations at a container orchestration platform as a broker via the provider plugin for each of a plurality of providers.

18. The method of claim 17, wherein performing the cluster life-cycle operations comprises:

creating a cluster life-cycle; and managing the cluster life-cycle at container orchestration platform once the cluster life-cycle has been created.

\* \* \* \* \*